United States Patent [19]

Francis

[11] 4,444,932

[45] Apr. 24, 1984

[54] MOLDABLE COMPOSITIONS HAVING IMPROVED SURFACE GLOSS

[75] Inventor: Peter S. Francis, Rose Valley, Pa.

[73] Assignee: Atlantic Richfield Company, Los Angeles, Calif.

[21] Appl. No.: 383,436

[22] Filed: Jun. 1, 1982

[51] Int. Cl.$^3$ .............................................. C08K 5/20
[52] U.S. Cl. .................................... 524/232; 524/112; 524/235
[58] Field of Search ....................... 524/233, 207, 235

[56] References Cited

U.S. PATENT DOCUMENTS 3,639,333  2/1972  Baitinger ............................. 524/233
4,352,904  10/1982  Deyrup ............................... 524/233

Primary Examiner—Joseph L. Schofer
Assistant Examiner—N. Sarofim
Attorney, Agent, or Firm—Dennis M. Kozak

[57] ABSTRACT

Moldable compositions which comprise a high molecular weight nonequimolar copolymer of an ethylenically unsaturated dicarboxylic acid or its derivative, and at least one copolymerizable monomer and, a surface gloss enhancing agent selected from the group consisting of amides or N,N-dimethylamides of linear and saturated or unsaturated fatty acids containing 16 or more carbon atoms and low molecular weight copolymers of styrene and maleic anhydride, facilitate the production of molded articles exhibiting improved surface gloss.

9 Claims, No Drawings

MOLDABLE COMPOSITIONS HAVING IMPROVED SURFACE GLOSS

This invention relates to moldable compositions.

More specifically, this invention relates to surface gloss enhancing agents for moldable compositions comprised of high molecular weight non-equimolar copolymers of ethylenically unsaturated dicarboxylic acids, or their derivatives, and at least one copolymerizable monomer.

High molecular weight non-equimolar copolymers of ethylenically unsaturated dicarboxylic acids, or their derivatives, and at least one copolymerizable monomer, such as, for example, non-equimolar copolymers of styrene and maliec anhydride are widely used in molding compositions to produce injection molded parts. Such molded parts typically exhibit low surface gloss and, accordingly, the compositions are not suitable for use in applications in which high surface gloss is a needed property. High surface gloss, for example, is critical in hand tool housings lighting fixtures and cosmetic kits.

The present invention provides agents which, when employed in moldable compositions which comprise a high molecular weight non-equimolar copolymer of ethylenically unsaturated dicarboxylic acids, or their derivatives, and at least one copolymerizable monomer, serve to increase the surface gloss of the resulting molded article.

As used herein, the term "high molecular weight" means a molecular weight of 100,000 or more and the term "low molecular weight" means a molecular weight of 5,000 or less.

According to this invention, there is provided a moldable composition comprising a high molecular weight molding grade non-equimolar copolymer of an ethylencially unsaturated dicarboxylic acid moiety and at least one monomer selected from the group consisting of monovinyl aryl monomers, unsaturated nitriles and acrylic monomers and, a surface gloss enhancing agent selected from the group consisting of amides or N,N-dimethyl amides of linear, saturated or unsaturated fatty acids containing at least 16 carbon atoms and low molecular weight copolymers of styrene and maleic anhydride, the amount of the gloss enhancing agent employed being sufficient to enhance the surface gloss of the resulting molded composition as compared to the surface gloss of the molded composition in the absence of the surface gloss enhancing agent.

Suitable high molecular weight non-equimolar copolymers are comprised of a minor amount, that is, less than 50 mole percent, of an ethylenically unsaturated dicarboxylic acid moiety and a major amount, that is, greater than about 50 mole percent, of one or more monomers copolymerizable therewith.

The acid moiety may be an ethylenically unsaturated dicarboxylic acid, its anhydride, its imide or substituted imides or a half acid derivative of such a dicarboxylic acid or mixtures thereof. Suitable acids and their derivatives useful in the present invention are maleic acid, fumaric acid, itaconic acid, citraconic acid, mesaconic acid, ethyl maleic acid, methyl itaconic acid, chloromaleic acid, dichlormaleic acid, bromomaleic acid, dibromomaleic acid and phenylmaleic acid, the anhydrides of these acids, the imides of these acids and their N-substituted derivatives, the acid amide derivatives, or the half esters of these with suitable alcohols. The alcohols used may be the primary and secondary alkanols containing up to 6 carbon atoms, such as, methyl alcohol, ethyl alcohol, n-propyl alcohol, n-butyl alcohol, sec-butyl alcohol, and n-pentyl alcohol; halogenated alkanols having up to 6 carbon atoms, such as 2,3-dichloro-1-propanol, and 2-bromo-1-propanol; arylalkyl alcohols, such as benzyl alcohol; cyclic alcohols having up to 6 carbon atoms, such as cyclopentanol, cyclohexanol and tetrahydrofurfuryl alcohol; ether alcohols, such as 2-butoxyethanol and the ethyl ether of diethylene glycol, and the like.

The imide derivatives may be prepared by reacting the starting anhydride or diacid copolymers with aqueous ammonia, ammonia or amines. Suitable amines are the alkyl amines having 1 to 4 carbon atoms, such as methylamine, ethylamine, propylamine, isopropylamine and butylamine; ethanolamine; aniline, benzylamine; allylamine and the like. Also suitable are the water soluble $\alpha,\omega$-alkylenediamines having 2 to 6 carbon atoms in the alkylene group, such as ethylenediamine, and hexamethylenediamine. Arylene diamines, such as the phenylene diamines and benzidines may also be used. The diamines are useful for preparing copolymers having varying degrees of crosslinking. These diamines may be used alone or in combination with other monoamines to vary the degree of crosslinking.

The copolymerizable monomers may be vinyl aryl monomers, such as styrene, alpha-methylstyrene, nuclear methylstyrenes, ethylstyrene, isopropylstyrene, tertbutylstyrene, chlorostyrenes, dichlorostyrenes, vinylnaphthalene and the like; unsaturated nitriles, such as acrylonitrile and methacrylonitrile; and acrylic monomers, such as acryylic acid, methacrylic acid, methyl acrylate and methyl methacrylate. Mixtures of two or more of these copolymerizable monomers may be used if desired.

The high molecular weight non-equimolar copolymers may be prepared by any of the several methods available for the preparation of non-equimolar copolymers. Thus, these copolymers may be prepared by solution polymerization directly from the respective monomers by the incremental addition of the reactive monomer as taught by U.S. Pat. No. 2,971,939; by a continuous recycle polymerization process such as described in U.S. Pat. Nos. 2,769,804 and 2,989,517; or by the suspension polymerization process described in U.S. Pat. No. 3,509,110.

The high molecular weight molding grade non-equimolar molar copolymers as described above can be impact modified using any art-recognized method of incorporating the impact modifier, which modifier is, typically, at least one copolymer or homopolymer rubber or mixtures thereof. Preferably, the impact modifiers are incorporated into the monomer mixture prior to polymerization using for example any of the methods of U.S. Pat. No. 4,097,551 (incorporated herein by reference).

Any soluble high molecular weight molding grade non-equimolar copolymer can be employed to produce the molding compositions of this invention.

Particularly suitable for use are the high molecular weight non-equimolar copolymers of styrene and maleic anhydride designated Dylark ® copolymers, commercially available from ARCO Chemical Compay, division of Atlantic Richfield Company. Suitable Dylark copolymers include those of the Dylark 200 series of copolymers, the Dylark 300 series of copolymers and Dylark 700 copolymer. Of these Dylar copolymers, Dylark 250, Dylark 350 and Dylark 700 are rubber-modified, as described above and are particularly suitable for use in the molding compositions of this invention.

The present invention is further illustrated by the following examples, set forth in the following Table, which examples are not to be construed as limiting.

TABLE

Gloss Values of Molded Compositions

| Example No. | Ingredients Non-equimolar Copolymer (wt. %)/ Surface Gloss Enhacing Agent (wt. %) | Gloss (% of Standard)* 60° | 45° | 20° |
|---|---|---|---|---|
| Control | Dylark ® 700 resin (100) | 78.0 | 50.3 | 27.0 |
| I | Dylark ® 700 resin (98)/behenic acid amide (2) | 94.7 | 55.5 | 72.0 |
| II | Dylark ® 700 resin (98)/N,N—dimethyl stearamide (2) | 94.6 | 56.0 | 73.2 |
| III | Dylark ® 700 resin (96)/behenic acid amide (4) | 94.0 | 53.7 | 73.4 |
| IV | Dylark ® 700 resin (96)/N.N. dimethyl stearamide (4) | 91.2 | 52.2 | 65.3 |
| V | Dylark ® 700 resin (94)/SMA ® Resin 1000 (6) | 84.9 | 47.5 | 45.1 |
| VI | Dylark ® 700 resin (94)/SMA ® Resin 2000 (6) | 83.8 | 48.7 | 56.4 |
| VII | Dylark ® 700 resin (94)/SMA ® Resin 3000 (6) | 88.0 | 51.8 | 62.5 |
| VIII | Dylark ® 700 resin (94)/SMA ® Resin 3840 (6) | 90.3 | 51.2 | 63.0 |
| CONTROL | Dylark ® 350 resin (100) | 86.9 | 55.1 | 45.5 |
| IX | Dylark ® 350 resin (98)/behenic acid amide (2) | 93.3 | 56.8 | 60.9 |
| X | Dylark ® 350 resin (94)/SMA ® Resin 3000 (6) | 87.3 | 49.4 | 55.2 |

*Gloss values were determined with a Gardner glossmeter.

tion.

As the surface gloss enhancing agent use can be made of any amides or N,N-dimethyl amides of linear, saturated or unsaturated fatty acids containing at least 16 carbon atoms. Particularly suitable amides or N,N-dimethyl amides include behenic acid amide, N,N-dimethylstearamide, oleamide, erucamide, stearamide, arachidamide and mixtures thereof.

Particularly suitable low molecular weight copolymers of styrene and maleic anhydride suitable for use as surface gloss enhancing agents are also commercially available from ARCO Chemical Company under the designation SMA ® Resins, such as, for example, SMA ® Resin 1000, SMA ® Resin 2000, and SMA ® Resin 3000. Methods for the manufacture of these SMA ® Resins are taught in U.S. Pat. Nos. 3,388,106; 3,418,292; 3,178,395; 3,085,986; 3,085,994; 3,342,787; 3,392,155; 3,451,979; 3,245,933; 3,046,246 and 3,245,933 incorporated herein by reference.

SMA ® Resin 1000 has a styrene to maleic anhydride ratio of 1/1 and a molecular weight of about 1600.

SMA ® Resin 2000 has a styrene to maleic anhydride ratio of 2/1 and a molecular weight of about 1700.

SMA ® Resin 3000 has a styrene to maleic anhydride ratio of 3/1 and a molecular weight of about 1900.

The moldable compositions of this invention can also include other ingredients, such as flame retardants, extenders, processing aids, pigments, stabilizers and the like, for their conventionally employed purposes. Reinforcing fillers, in amounts sufficient to impart reinforcement, can be used, such as aluminum, iron or nickel, and the like, and non-metals, such as carbon filaments, silicates, such as acicular calcium silicate, asbestos, titanium dioxide, potassium titanate and titanate whiskers, glass flakes and fibers.

The moldable compositions can be prepared using any conventional method which will result in an essentially homogeneous mixture of non-equimolar copolymer and surface gloss enhancing agent such as, for example, compounding rolls, mixing extruders, Banbury mixers and the like. Preferably, the non-equimolar copolymers is prepared and the surface gloss enhancing agent is added to the copolymer as it is pumped out of the polymerization reactor and into an extruder.

Typically, the surface gloss enhancing agent will be employed in an amount within the range of from about 0.5 to about 10 weight percent of the molding composition.

The above data indicate the marked improvement in surface gloss achieved by the molding compositions of this invention when employed to produce molded articles.

It will be evident from the foregoing that various modifications can be made to this invention. Such, however, are considered as being within the scope of the invention.

What is claimed is:

1. A moldable composition comprising a high molecular weight molding grade non-equimolar copolymer of an ethylenically unsaturated dicarboxylic acid moiety and at least one monomer selected from the group consisting of monovinyl aryl monomers, unsaturated nitriles and acrylic monomers, and a surface gloss enhancing agent selected from the group consisting of amides or N,N-dimethyl amides of linear, saturated or unsaturated fatty acids containing at least 16 carbon atoms and low molecular copolymers of styrene and maleic anhydride, the amount of surface gloss enhancing agent employed being sufficient to enhance the surface gloss of the resulting molded compositions as compared to the surface gloss of the molded composition in the absence of the surface gloss enhancing agent.

2. The moldable composition of claim 1 in which said high molecular weight molding grade non-equimolar copolymer has a molecular weight of 100,000 or more.

3. The moldable composition of claim 1 in which said low molecular weight copolymers of styrene and maleic anhydride have molecular weights of 5,000 or less.

4. The moldable composition of claim 1 in which said high molecular weight molding grade non-equimolar copolymer is a styrene-maleic anhydride copolymer.

5. The moldable composition of claim 4 in which said styrene-maleic anhydride copolymer is impact modified.

6. The moldable composition of claim 4 in which said styrene-maleic andyhride copolymer is filled.

7. The moldable composition of claim 1 in which said surface gloss enhancing agent is employed in an amount within the range of from about 0.5 to about 10 weight percent of the moldable composition.

8. The moldable composition of claim 1 in which said surface gloss enhancing agent is behenic acid amide.

9. The moldable composition of claim 1 in which said surface gloss enhancing agent is N,N dimethylstearamide.

* * * * *